United States Patent [19]

Petitcollin et al.

[11] Patent Number: 5,017,210
[45] Date of Patent: May 21, 1991

[54] METHOD AND APPARATUS FOR POSITIONING OF A GLASS SHEET RELATIVE TO CAMBERING AND/OR OTHER HEAT TREATMENT TOOLS

[75] Inventors: Jean-Marc Petitcollin; Gerard-Jean Harle, both of Thourotte, France

[73] Assignee: Saint-Gobain Vitrage International, Courbevoie, France

[21] Appl. No.: 497,670

[22] Filed: Mar. 23, 1990

[30] Foreign Application Priority Data

Mar. 24, 1989 [FR] France .................. 89 03934

[51] Int. Cl.⁵ .................................. C03B 23/02
[52] U.S. Cl. .............................. 65/106; 65/287
[58] Field of Search ............... 65/106, 107, 286, 290, 65/104, 287

[56] References Cited

U.S. PATENT DOCUMENTS

| | | | |
|---|---|---|---|
| 3,615,338 | 10/1971 | Boyles | 65/290 X |
| 4,119,427 | 10/1978 | Revells | 65/287 X |
| 4,571,253 | 2/1986 | Revells et al. | 65/290 X |
| 4,767,437 | 8/1988 | Lampman et al. | 65/287 X |
| 4,781,745 | 11/1988 | Mumford | |
| 4,813,993 | 3/1989 | Letemps et al. | 65/287 X |

FOREIGN PATENT DOCUMENTS 0003391 8/1979 European Pat. Off.
0267120 5/1988 European Pat. Off.

Primary Examiner—Robert L. Lindsay
Attorney, Agent, or Firm—Oblon, Spivak, McClelland, Maier & Neustadt

[57] ABSTRACT

In positioning of a glass sheet relative to cambering and/or other heat treatment tools during a treatment, the glass sheet (2) heated to beyond its softening point travels flat on a conveyor (3) before being stopped beneath a generally shaping upper element (8) against which it is applied and is then released onto a lower element (10) by which shaping optionally continues and/or the glass sheet is transferred to another device, particularly a cooling device by thermal tempering. The position of the glass sheet (2) relative to the upper element (8) and/or the position of the upper element (8) relative to the lower element (10) are controlled by members integral with the upper element (8).

18 Claims, 2 Drawing Sheets

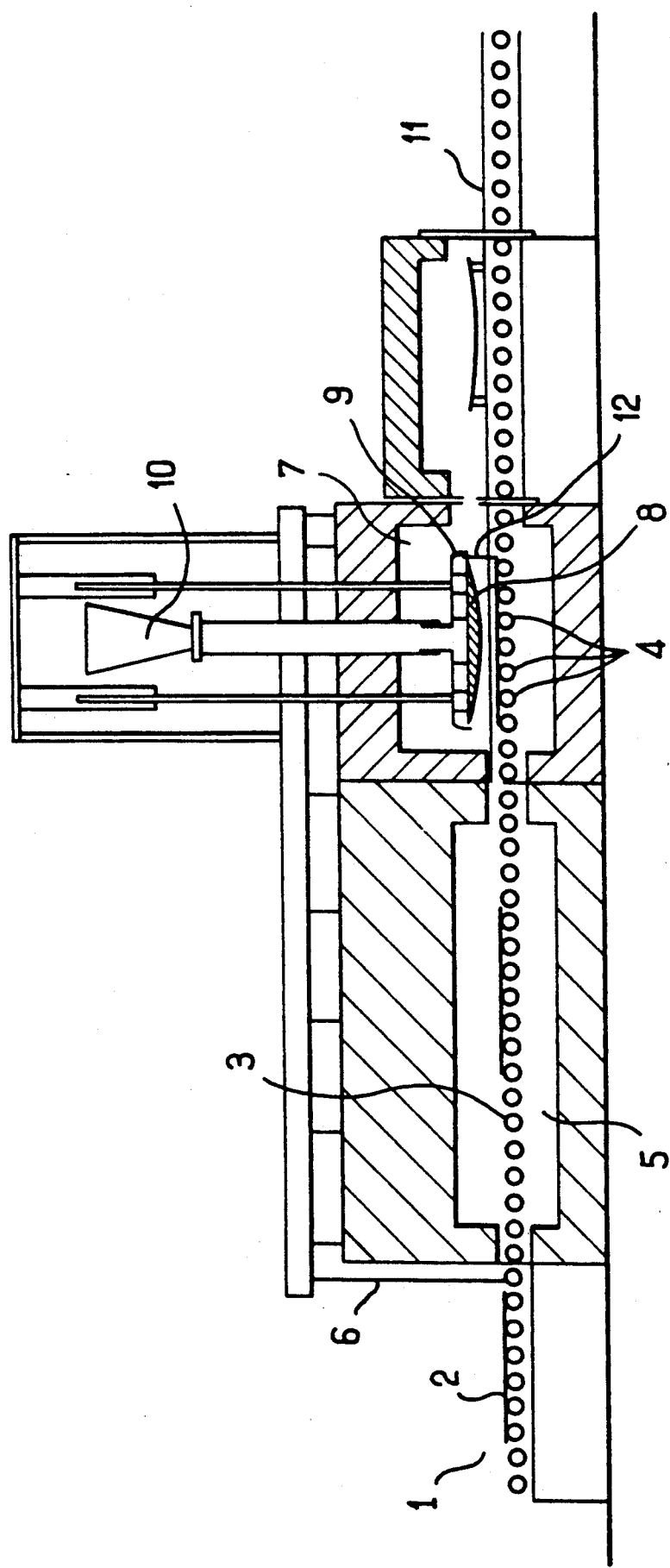
FIG_1

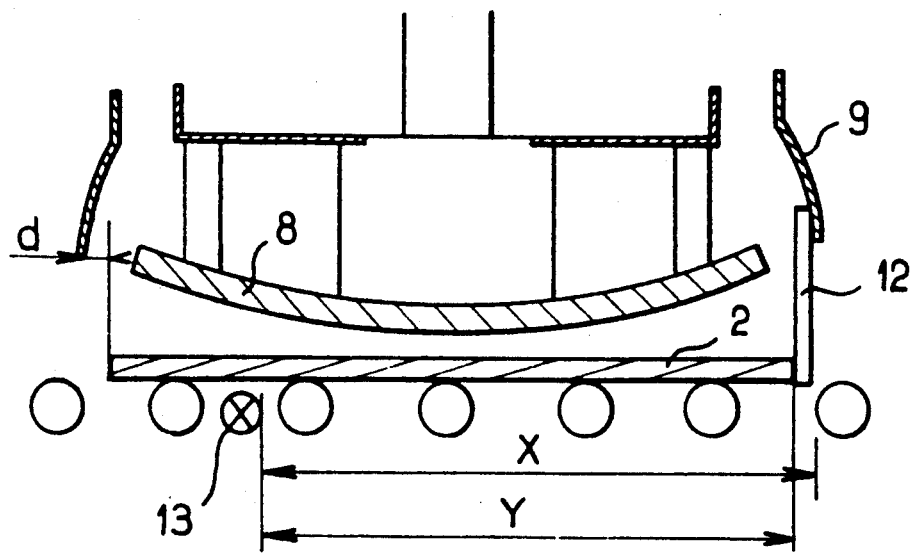
FIG_2
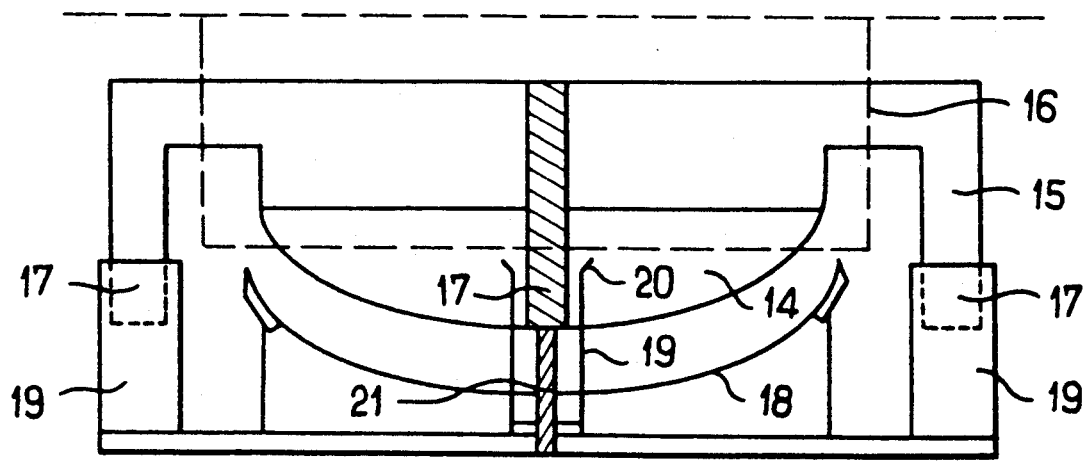
FIG_3

METHOD AND APPARATUS FOR POSITIONING OF A GLASS SHEET RELATIVE TO CAMBERING AND/OR OTHER HEAT TREATMENT TOOLS

BACKGROUND OF THE INVENTION

1. Field of the Invention

The invention relates to the positioning of a glass sheet relative to cambering and/or other heat treatment tools. It applies to procedures for cambering glass sheets used for the production of motor vehicle windows and according to which the glass sheets heated to beyond their softening point travel flat on a conveyor before being stopped beneath an upper, shaping element against which they are applied and are then released on a lower element, by means of which shaping optionally continues and/or by means of which the glass sheet is transferred to another device, particularly a cooling device by thermal tempering.

2. Background of the Related Art

In the flat cambering methods referred to hereinbefore, the glass sleets are heated in a furnace traversed by the sheets conveyed on a roller bed. Though providing high production rates it is necessary to have high conveying speeds and considerable furnace lengths. Under these conditions, it is not possible to predict the orientation of a glass sheet when it leaves the furnace. Although this impossibility of making a prediction must be understood in relative terms, because the position of the glass sheets is obviously not completely of a random nature, the remaining uncertainty is sufficient to lead to shaping defects due to the appropriate camber not being respected and/or to marks in the glass. This is because the requisite positioning accuracy beneath the upper element is less than 1 mm and is generally approximately 1/10 to a few tenths of a mm.

Different glass sheet positioning methods have been proposed in the past. Thus, it is e.g. known from EP-B-146 442 to use a starting apparatus ensuring a correct initial positioning on entering the furnace. Means are also known for rectifying the position of a glass sheet in or at the outlet from the furnace, the main difficulty being that on approaching the upper element, the glass becomes softer and consequently any action on it may cause optical defects.

In view of the needed optical quality and the tolerance with regards to the camber as a function of the future installation of the glass plate or window, e.g. in a motor vehicle body, it is necessary to have a perfect positioning of the leading edge of a glass sheet, i.e. a correct frontal positioning.

It is known from European patent application EP-A-267 120 to orient the glass sheet by making the leading edge strike against a retractable shutter (or optionally fingers) extended through the conveyor, said stutter holding back the sheet, while the conveyor continues to move it, thus making the sheet assume an alignment with respect to said shutter. However, such an apparatus has difficulty in operating if the leading edge of the sheets is not oriented parallel to the rollers, which is often the case with triangular members, e.g. those needed for padded sides or arm rests in motor vehicles.

To this disadvantage, which can be obviated by a greater sophistication of the retraction means, is added a more fundamental defect, namely that the glass sheet is only referenced relative to the conveyor. However, the Applicants have noted positioning variations of the upper element. Thus, despite its considerable weight and due to the vertical displacements imposed and the high temperatures to which it is exposed, the upper element has a fluctuating position with respect to the vertical position of the conveyor. Here again, it is not a question of a fluctuation of great magnitude, but it is significant in view of the required positioning accuracy.

Moreover, correcting the position of the glass sheet is only sensible to the extent that it is then stopped precisely at the desired moment. In the aforementioned EP-A-267 120, said stoppage is obtained with a regulatable delay by stopping the conveyor after it meets the glass using a detection device of the type described in EP-B-217 708. Therefore the positioning and stoppage of the glass sheets are two independent operations, so that there is a risk that the orientation of a glass sheet will be modified between the action of the shutter and stoppage. Moreover, the stopping of the glass sheet is obtained directly by the stopping of the conveyor. If the upper element has moved with respect to the conveyor, the stepping position is still incorrect.

Finally at the time of shaping, due to the movement of the upper element against a lower element, there is added a shaping treatment by the lower element (continuation of the shaping and/or discharge to a cooling device). If the upper shape or mold moves, the position of the glass on the lower element can no longer be predetermined and this once again leads to glass cambering and/or marking defects.

SUMMARY OF THE INVENTION

An object of the present invention is to provide a method and apparatus for the positioning of a glass sheet relative to cambering and/or other heat treatment tools, particularly with respect to the upper element and the lower element, in order to ensure a greater production uniformity.

According to the invention this objective is achieved by the fact that for the positioning of a glass sheet relative to the cambering and/or other heat treatment tools, during a treatment in which the glass sheet heated to above its softening point travels flat on a conveyor before being stopped beneath an upper shaping element, against which it is applied, followed by release onto a lower element by means of which the shaping optionally continues and/or the glass sheet is transferred to another device, more particularly a cooling device by thermal tempering, the position of the glass sheet relative to the upper element and/or the position of the upper element relative to the lower element are controlled by members integral with the upper element.

According to the invention the positioning of the glass sheet relative to the upper element is obtained by means of an apparatus constituted by at least one stop member fixed directly to the upper element, or mounted on a means carried with the upper element, said stop member defining the end position of the leading edge of the glass sheet beneath the upper member.

The stop member according to the invention undergoes precisely the same displacement as does the upper element. Therefore the glass sheet is stopped below the real position of the upper element, without it being necessary to determine the latter beforehand. In addition, as the stop member serves both as a stopping point and as a positioning means, it is not possible for any displacement of the glass sheet to take place between the instant of its positioning and that of its stoppage.

As stated hereinbefore, the glass sheet is stopped in its travel by the stop member, which implies that the conveyor is still in action at this time. However, it is preferable for the glass sheet travel speed to be low in order to limit friction against rollers. The conveyor is stopped as soon as the glass sheet has definitely been blocked.

Preferably, the action of the rollers on the glass sheet is reduced by the use of means able to take up part of the glass sheet weight. These relief means are, e.g., constituted by blowing hot air or suction. Advantageously these relief means are of the same type as those used for the raising and engaging of the glass sheet against the upper element.

Advantageously the carried means on which is mounted the stop member is constituted by the walls of a container surrounding the upper element. This container is preferably that used for channelling suction to the periphery of the upper element for cambering purposes, according to which the raising of the glass sheet and the engagement thereof against the upper element are obtained by a vacuum created in the vicinity of the periphery of the glass sheet and as is, e.g., known from FR-B-2 085 464, EP-A-240 418 and EP-A-241 335. In such a case, the mounting of the stop member according to the invention is particularly simple, in view of the fact that the container walls have a shape corresponding to the periphery of the glass sheet. It is therefore sufficient to extend the corresponding wall of the container in order to obtain a stop member for the leading edge of the glass sheet.

The stop member is, e.g., constituted by a shutter or abutments, of which preferably two are provided. These abutments are, e.g., formed by rings and can fulfil precisely the same functions as a shutter, while reducing the friction exerted during the raising of the glass sheet. If appropriate, these abutments are distributed along the wall of the container surrounding the upper element.

The second type of positioning proposed by the invention is that of the lower element relative to the upper element. It consists of ensuring a correct positioning of the glass sheet on the lower element, the position of the upper element being to some extent uncertain, as stated hereinbefore. According to the invention this positioning is obtained by indexing means such as pointers, markers or indicators respectively integral with the upper element and the lower element.

These pointers ar preferably constituted by parts respectively in the form of knives and forks, the knives being, e.g., integral with the upper element and are located between the two branches of the forks fixed to the lower element. Using such pointers, the relative positions of the lower and upper elements are retained, even if the upper element expands differently from the lower element.

These pointers are preferably placed on each of the two median axes of the rectangle in which the upper element is inscribed. When using relatively long knives and forks, they ensure the guidance of the upper element when it approaches the lower element and only two pointers are needed. If short knives are preferred, particularly for overall dimensional reasons, preferably three or four pointers are used.

With the forks are preferably associated abutments placed between the two branches, said abutments defining a minimum distance between the lower and upper members, which avoids the flattening of a glass sheet by a quantity greater than that required for its shaping.

The two positionings proposed according to the invention relative to the position of the upper element are complementary, but each provides a significant improvement to the quality of the glass plates produced, so that the production line need only be equipped with one or other of the means proposed.

DETAILED DESCRIPTION OF THE DRAWINGS

FIG. 1 is a schematic view of a cambering installation with a stop member associated with the upper element according to the invention;

FIG. 2 is a larger scale view of the upper element and its stop member; and

FIG. 3 is a schematic view of an upper element and a lower element equipped with a device for positioning one with respect to the other by a cross-like pointer system.

DETAILED DESCRIPTION OF THE PREFERRED EMBODIMENTS

FIG. 1 is a schematic view of a cambering installation using an upper element. Details of such installations can be found in FR-B-2 085 464, EP-A-240 418 and EP-A-241 335.

Such an installation has a starting station 1 in which the glass sheets 2 are deposited on a conveyor 3, in this case constituted by a driven roller bed 4. By means of the said conveyor 3, the glass sheets are introduced into a furnace 5 closed by a curtain 6. In the furnace 5, the glass sheets are progressively heated while travelling one behind the other. The sheets enter a cambering station 7 at the end of the furnace 5. The cambering station 7 has an upper element 8 beneath which the glass sheet is stopped. This upper element 8 is in this case constituted by a cambering mold, whose curvature corresponds wholly or partly to the final curvature which it is wished to give to the glass sheet. In certain cases the curvature can be different from the desired curvature or the cambering mold can be flat, there then being no desire to preshape the glass sheet. This cambering mold 8 is placed in a bottomless container 9, whose opening corresponds to the dimensions of the glass plate, with a slight oversize in order to enable the sheet to enter container 9. This container 9 is connected to one or more suction plates 10 making it possible to create a vacuum in the container 9, so that the glass sheet can be raised and engaged against mold 8. The container 9 and the mold 8 are fixed with respect to one another, but both can be raised in such a way that a lower element travelling on rails 11 can be located beneath the upper element 8, in order to recover a glass sheet and, e.g., carry it to a cooling device by thermal tempering. On the container is mounted a stop member 12, which prevents a glass sheet 2 from continuing further downstream in its travel on the conveyor 3.

In referring now to FIG. 2, which diagramatically shows a glass sheet during positioning, it should be noted that the opening of the suction container 9 is slightly larger than the glass sheet 2 prior to its cambering and that there is an oversize "d" for preventing any marking risk, particularly when the container walls descend sufficiently to envelop all or part of the upper element 8, which is not the case shown here, but is in accordance with variants of cambering processes known, e.g., from FR-B-2 085 464.

According to the invention, on the side of the leading edge of the glass sheet 2, said oversize "d" is used for housing an abutment in the form of a stop member 12, preferably constituted by two rings fixed to the lower wall of the suction container 9 and whose thickness corresponds to "d". When a glass sheet 2 abuts against the two rings 12, it is perfectly positioned beneath the upper element.

A glass sheet is positioned and stopped in the following way. A glass sheet 2 travelling on the conveyor 3 is detected by a contactless detector 13. This detector brings about a slow travel of the conveyor 3 and also controls the stopping of the latter after a sufficient time lag to enable the leading edge of the glass sheet to cover a distance "X". The latter is slightly greater than the distance "Y", which has to be covered by the glass sheet in order to reach the stop member 12, the variation between "X" and "Y" preferably being less than 10 mm, but equal to or greater than the greatest displacement of the leading edge which has occurred, so as to systematically reorient any glass sheet. Thus, no matter what the position of the container and the upper element 8 associated therewith, the glass sheet is still perfectly positioned with respect to said upper element.

It should be noted that, surprisingly, the slight friction between the leading edge of the glass sheet during the upward travel towards the upper element does not lead to any defect in the glass. There is also no disturbing marking of the glass sheet. This friction does lead to a slight delay in the upward travel of the leading edge with respect to that of the trailing edge, but this leads to no cambering and/or optical defect.

The abutments can be mounted in a mobile manner and are then associated with means to move them aside, e.g. a jack or counterweight.

The positioning apparatus according to the invention can advantageously be used in a high capacity cambering installation having the possibility of simultaneously cambering several plates, such as is described in patent application EP-A-267 121. For this purpose, it is merely necessary to lower the assembly carrying the upper elements only after the penultimate glass sleet has passed beyond the zone which must be occupied by the stop member of the final upper element, the order of the upper elements and the sheets corresponding in the glass sheet passage direction. In all cases, the distance between two glass sheets is adequate for the lowering of the stop member to take place without any risk of damage to the glass.

The case of an upper element constituted by a curved cambering mold mounted in a suction container larger than the glass plate has been described. Other cambering means can also be used without exceeding the scope of the invention. Thus, it is known to use a suction container smaller than the glass plate and, even smaller than the cambering mold. In this case, the abutments will be mounted outside and not inside the container, using appropriate clips.

In addition, specific reference has been made to the case where, for the actual cambering, the upper element is systematically associated with means integral therewith, namely the suction container. However, this container need only serve as a support for the abutments according to the invention, which is the case when using an upper element provided with suction ports or when the glass is raised by a rising hot air stream. Finally, little significance is attached to whether or not the upper element is curved. Moreover, when the cambering mold used makes it possible, the abutments can be mounted directly on it by means of clips fixed to the rear or on the sides of the cambering mold.

FIG. 3 illustrates the positioning of the upper element relative to the lower element. It is possible for the upper element 14 to be a cambering mold fixed to a frame 15. Optionally the cambering mold 14 is surrounded by a bottomless vacuum container 16. To frame 15 are fixed knives 17.

To the upper element 14 corresponds a lower element 18, which is preferably constituted by a centrally open frame and on which the glass sheet must be released. To said lower element 18 are fixed forks 19 between whose branches can slide the knives 17. The branches of the forks have widened ends 20, so as to guide the knives 17. The knives and forks comprise index means.

Preference is given to the use of three or four assemblies of knives and forks, which are placed on the two median axes of the upper member, so as to obtain a reference indexing on the two perpendicular axes.

Other pointer types can be used, such as fingers, but preference is given to systems of knives and forks, because even after positioning has taken place, they allow different expansions of the upper element and the lower element.

Advantageously at least one of the forks 19 contains an abutment 20, which is struck by the end of a knife 17 of the upper element 14, so that the latter cannot descend by less than a given height.

The positioning of the upper element relative to the lower element is preferably added to a positioning of the glass sheet with respect to said upper element.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for positioning a glass sheet, heated to beyond its softening point, relative to a heat treatment tool, comprising the steps of:
   moving a horizontally oriented glass sheet on a conveyor to a position beneath the heat treating tool;
   stopping movement of the glass sheet by stop means fixed to the heat treatment tool and positioned to be abutted by an upstream edge of the glass sheet on the conveyor, whereby said glass sheet is precisely positioned with said heat treatment tool; and
   treating the glass sheet with said heat treatment tool.

2. Process according to claim 1 wherein said heat treatment tool comprises a cambering tool, further comprising the step of shaping the glass sheet by applying the glass sheet onto the cambering tool.

3. Process according to claim 2 including the steps of transferring the glass sheet applied onto the cambering tool onto a lower shaping element, and further shaping the glass sheet on the lower shaping element.

4. Process according to claim 3 including the step of using members integral with the cambering tool for aligning the cambering tool and the lower shaping element.

5. Process according to claim 4 including the step of transferring the shaped glass sheet to a cooling device.

6. A positioning apparatus for positioning a heated glass sheet relative to an upper shaping element, comprising:

a conveyor extending beneath the upper shaping element for delivering a horizontally disposed glass sheet to a position beneath the upper shaping element;

at least one stop member fixed to said upper shaping element at a position such that said stop member is abutted by an upstream edge of the glass sheet on the conveyor and is precisely positioned with said upper shaping element.

7. Positioning apparatus according to claim 6 including means for applying the glass sheets onto the upper shaping element.

8. Positioning apparatus according to claim 7 including a lower shaping element and means for transferring the glass sheet applied to the upper shaping element onto the lower shaping element.

9. Positioning apparatus according to claim 8 including a container in which the upper shaping element is mounted, said stop member being fixed to said container.

10. Positioning apparatus according to claim 8 including a contactless detector means for detecting a glass sheet on the conveyor.

11. Positioning apparatus according to claim 8 wherein said stop member comprises a shutter.

12. Positioning apparatus according to claim 8 wherein said stop member comprises at least one abutment.

13. Positioning apparatus according to claim 6 comprising:
a lower shaping element positioned below said upper shaping element; and
indexing means integral with said upper and lower shaping elements for aligning said upper and lower shaping elements.

14. Positioning apparatus according to claim 13 including at least one stop member fixed relative to said upper shaping element at a position such that said stop member is abutted by an upstream edge of the glass sheet on the conveyor.

15. Positioning apparatus according to claim 13 wherein said indexing means extend parallel to one another.

16. Positioning apparatus according to claim 1 wherein said indexing means comprise knives fixed to said upper shaping element and engageable with forks fixed to said lower shaping element.

17. Positioning apparatus according to claim 16 including abutments mounted to said knives for limiting movement of said knives.

18. Positioning apparatus according to claim 6 including means for at least partially lifting the glass sheet off of the conveyor.

* * * * *